(12) United States Patent
Zhang

(10) Patent No.: US 9,537,623 B2
(45) Date of Patent: Jan. 3, 2017

(54) METHOD, APPARATUS, BASE STATION AND USER EQUIPMENT FOR REDUCING INTERFERENCE IN A WIRELESS COMMUNICATION SYSTEM

(75) Inventor: Xiaobo Zhang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 240 days.

(21) Appl. No.: 14/008,627

(22) PCT Filed: Mar. 28, 2012

(86) PCT No.: PCT/IB2012/000878
§ 371 (c)(1),
(2), (4) Date: Sep. 30, 2013

(87) PCT Pub. No.: WO2012/131498
PCT Pub. Date: Oct. 4, 2012

(65) Prior Publication Data
US 2014/0016597 A1 Jan. 16, 2014

(30) Foreign Application Priority Data

Mar. 31, 2011 (CN) .......................... 2011 1 0081521

(51) Int. Cl.
*H04W 4/00* (2009.01)
*H04L 5/00* (2006.01)
(Continued)

(52) U.S. Cl.
CPC ........... *H04L 5/0032* (2013.01); *H04L 5/0044* (2013.01); *H04L 5/0073* (2013.01); *H04L 5/1469* (2013.01);
(Continued)

(58) Field of Classification Search
CPC ............................... H04L 5/0032; H04L 5/003
(Continued)

(56) References Cited

U.S. PATENT DOCUMENTS

2008/0117226 A1 5/2008 Edge et al.
2010/0238845 A1* 9/2010 Love .................. H04B 7/15528
370/280
(Continued)

FOREIGN PATENT DOCUMENTS

CN 1784068 A 6/2006
CN 101651895 A 2/2010
(Continued)

OTHER PUBLICATIONS

International Search Report for PCT/IB2012/000878 dated Sep. 13, 2012.
(Continued)

*Primary Examiner* — Dang Ton
*Assistant Examiner* — Abdeltif Ajid
(74) *Attorney, Agent, or Firm* — Fay Sharpe, LLP

(57) ABSTRACT

A method, an apparatus, a base station and user equipment for reducing interference in a wireless communication system are provided. The wireless communication system comprises a first cell and a second cell. The method includes mapping a resource grid of at least one of a first type of sub-frame and a second type of sub-frame to reserve at least one resource element in the first type of sub-frame and corresponding to a resource element in the second type of sub-frame and mapped for at least reference signal and a common control channel, and a resource element in the second type of sub-frame and corresponding to a resource element in the first type of sub-frame and mapped for at least one reference signal and a common control channel, for not transmitting information; and transmitting a mapping result of the mapping.

15 Claims, 6 Drawing Sheets

(51) Int. Cl.
  *H04L 5/14*     (2006.01)
  *H04W 72/12*    (2009.01)

(52) U.S. Cl.
  CPC ........ *H04W 72/1278* (2013.01); *H04L 5/0087* (2013.01); *H04W 72/1226* (2013.01)

(58) Field of Classification Search
  USPC .......................................................... 370/329
  See application file for complete search history.

(56) References Cited

U.S. PATENT DOCUMENTS

| | | |
|---|---|---|
| 2010/0323745 A1 | 12/2010 | Chen et al. |
| 2011/0044391 A1 | 2/2011 | Ji et al. |
| 2011/0268077 A1 | 11/2011 | Wan et al. |
| 2012/0149297 A1 | 6/2012 | Suh et al. |
| 2013/0155917 A1 | 6/2013 | Hu et al. |

FOREIGN PATENT DOCUMENTS

| | | |
|---|---|---|
| CN | 101777941 | 7/2010 |
| CN | 101795473 A | 8/2010 |
| CN | 101800569 A | 8/2010 |
| CN | 101827053 A | 9/2010 |
| CN | 102387543 A | 3/2012 |
| EP | 2 603 027 | 6/2013 |
| WO | WO 2009/095369 | 8/2009 |
| WO | WO 2010/039739 | 4/2010 |
| WO | WO 2010/058911 | 5/2010 |
| WO | WO 2010/064842 | 6/2010 |
| WO | WO 2011/021837 | 2/2011 |
| WO | WO 2012/028025 | 3/2012 |

OTHER PUBLICATIONS

CMCC, "Discussion of the possibility of using subframe offset for interference avoidance in TDD systems", R1-105272, 3GPP TSG-RAN WG1 #62bis, Xi'an China, Oct. 11-15, 2010.
European Search Report dated Sep. 26, 2014.

* cited by examiner

METHOD, APPARATUS, BASE STATION AND USER EQUIPMENT FOR REDUCING INTERFERENCE IN A WIRELESS COMMUNICATION SYSTEM

FIELD OF THE INVENTION

The present invention relates to communication field, and more particularly relates to a method, an apparatus, a base station and user equipment for reducing interference in a wireless communication system.

BACKGROUND OF THE INVENTION

Theoretically speaking, a Long-Term Evolution Time-Division Duplex (LTE TDD) system can deploy different uplink/downlink sub-frame configuration for adjacent cells, which is claimed as one of the important advantages. However, deploying different uplink/downlink sub-frame configuration for adjacent cells will result in implementing an uplink sub-frame at a first cell while implementing a downlink sub-frame at a second cell, thereby producing inter-cell interference. The produced inter-cell interference could be disastrous for the system. The inter-cell interference thus produced may be divided into an interference of an uplink User Equipment (UE) on a downlink UE and an interference of a downlink base station, e.g. an Evolved Node B (eNB) on an uplink eNB. How to reduce the inter-cell interference has been addressed by many papers.

It is an object of the present invention to provide a new scheme for reducing or even eliminating the inter-cell interference resulting from deploying different uplink/downlink sub-frame configuration for adjacent cells.

SUMMARY OF THE INVENTION

According to the first aspect of the present invention, there is provided a method for reducing interference in a wireless communication system, the wireless communication system comprising a first cell and a second cell, wherein uplink/downlink sub-frame configuration of the first cell and the second cell is asymmetry and may result in implementing a first type of sub-frame at the first cell while implementing a second type of sub-frame different from the first type of sub-frame at the second cell, thereby producing inter-cell interference, the method comprising:

mapping a resource grid of at least one of the first type of sub-frame and the second type of sub-frame to reserve at least one of a resource element in the first type of sub-frame and corresponding to a resource element in the second type of sub-frame and mapped for at least one of a reference signal and a common control channel, and a resource element in the second type of sub-frame and corresponding to a resource element in the first type of sub-frame and mapped for at least one of a reference signal and a common control channel, for not transmitting information; and
transmitting a mapping result of the mapping step.

According to the second aspect of the present invention, there is provided an apparatus for reducing interference in a wireless communication system, the wireless communication system comprising a first cell and a second cell, wherein uplink/downlink sub-frame configuration of the first cell and the second cell is asymmetry and may result in implementing a first type of sub-frame at the first cell while implementing a second type of sub-frame different from the first type of sub-frame at the second cell, thereby producing inter-cell interference, the apparatus comprising:

a mapper configured to map a resource grid of at least one of the first type of sub-frame and the second type of sub-frame to reserve at least one of a resource element in the first type of sub-frame and corresponding to a resource element in the second type of sub-frame and mapped for at least one of a reference signal and a common control channel, and a resource element in the second type of sub-frame and corresponding to a resource element in the first type of sub-frame and mapped for at least one of a reference signal and a common control channel, for not transmitting information; and
a transmitter configured to transmit a mapping result of the mapper.

According to the third aspect of the present invention, there is provided a method for reducing interference in a wireless communication system, the wireless communication system comprising a first cell and a second cell, wherein uplink/downlink sub-frame configuration of the first cell and the second cell is asymmetry and may result in implementing a first type of sub-frame at the first cell while implementing a second type of sub-frame different from the first type of sub-frame at the second cell, thereby producing inter-cell interference, the method comprising:

receiving information related to mapping of a resource grid of the first type of sub-frame or information related to mapping of a resource grid of the second type of sub-frame, wherein the resource grid of the first type of sub-frame is mapped as reserving a resource element in the first type of sub-frame and corresponding to a resource element in the second type of sub-frame and mapped for at least one of a reference signal and a common control channel, for not transmitting information; and the resource grid of the second type of sub-frame is mapped as reserving a resource element in the second type of sub-frame and corresponding to a resource element in the first type of sub-frame and mapped for at least one of a reference signal and a common control channel, for not transmitting information.

According to the fourth aspect of the present invention, there is provided a base station for reducing interference in a wireless communication system, the wireless communication system comprising a first cell and a second cell, wherein uplink/downlink sub-frame configuration of the first cell and the second cell is asymmetry and may result in implementing a first type of sub-frame at the first cell while implementing a second type of sub-frame different from the first type of sub-frame at the second cell, thereby producing inter-cell interference, the base station comprising:

a receiver configured to receive information related to mapping of a resource grid of the first type of sub-frame or information related to mapping of a resource grid of the second type of sub-frame, wherein the resource grid of the first type of sub-frame is mapped as reserving a resource element in the first type of sub-frame and corresponding to a resource element in the second type of sub-frame and mapped for at least one of a reference signal and a common control channel, for not transmitting information; and the resource grid of the second type of sub-frame is mapped as reserving a resource element in the second type of sub-frame and corresponding to a resource element in the first type of sub-frame and mapped for at least one of a reference signal and a common control channel, for not transmitting information.

According to the fifth aspect of the present invention, there is provided a method for reducing interference in a wireless communication system, the wireless communication system comprising a first cell and a second cell, wherein uplink/downlink sub-frame configuration of the first cell and the second cell is asymmetry and may result in implementing a first type of sub-frame at the first cell while implementing a second type of sub-frame different from the first type of sub-frame at the second cell, thereby producing inter-cell interference, the method comprising:

receiving information related to mapping of a resource grid of the second type of sub-frame;

mapping a resource grid of the first type of sub-frame to reserve a resource element in the first type of sub-frame and corresponding to a resource element in the second type of sub-frame and mapped for at least one of a reference signal and a common control channel, for not transmitting information.

According to the sixth aspect of the present invention, there is provided a base station for reducing interference in a wireless communication system, the wireless communication system comprising a first cell and a second cell, wherein uplink/downlink sub-frame configuration of the first cell and the second cell is asymmetry and may result in implementing a first type of sub-frame at the first cell while implementing a second type of sub-frame different from the first type of sub-frame at the second cell, thereby producing inter-cell interference, the base station comprising:

a receiver configured to receive information related to mapping of a resource grid of the second type of sub-frame;

a mapper configured to map a resource grid of the first type of sub-frame to reserve a resource element in the first type of sub-frame and corresponding to a resource element in the second type of sub-frame and mapped for at least one of a reference signal and a common control channel, for not transmitting information.

According to the seventh aspect of the present invention, there is provided user equipment for reducing interference in a wireless communication system, the wireless communication system comprising a first cell and a second cell, wherein uplink/downlink sub-frame configuration of the first cell and the second cell is asymmetry and may result in implementing a first type of sub-frame at the first cell while implementing a second type of sub-frame different from the first type of sub-frame at the second cell, thereby producing inter-cell interference, the user equipment comprising:

a receiver configured to receive information related to mapping of a resource grid of the first type of sub-frame or information related to mapping of a resource grid of the second type of sub-frame, wherein the resource grid of the first type of sub-frame is mapped as reserving a resource element in the first type of sub-frame and corresponding to a resource element in the second type of sub-frame and mapped for at least one of a reference signal and a common control channel, for not transmitting information; and the resource grid of the second type of sub-frame is mapped as reserving a resource element in the second type of sub-frame and corresponding to a resource element in the first type of sub-frame and mapped for at least one of a reference signal and a common control channel, for not transmitting information.

According to the present invention, since reserving at least one of a resource element in the first type of sub-frame and corresponding to a resource element in the second type of sub-frame and mapped for at least one of a reference signal and a common control channel, and a resource element in the second type of sub-frame and corresponding to a resource element in the first type of sub-frame and mapped for at least one of a reference signal and a common control channel, for not transmitting information, the inter-cell interference of at least one of a reference signal and a common control channel can be reduced, and thereby the performance of the system can be improved significantly.

BRIEF DESCRIPTION OF THE DRAWINGS

Other objects and effects of the present invention will become clearer and easier to understand by making references to the following description in conjunction with the accompanying drawings and along with more comprehensive understanding of the present invention, wherein.

In all of the accompanying drawings, the same reference signs represent identical, similar or corresponding features or functions.

DETAILED DESCRIPTION OF EMBODIMENTS

Embodiments of the present invention will be described below in detail by making references to the accompanying drawings.

Figure 1:
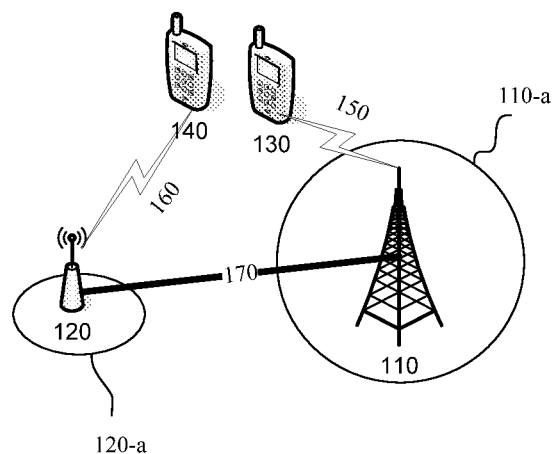
FIG. 1 illustrates a wireless communication system where the present invention can be carried out.

FIG. 1 illustrates a wireless communication system where the present invention can be carried out.

As illustrated in FIG. 1, the wireless communication system 100 comprises a first base station 110 corresponding to a first cell, a second base station 120 corresponding to a second cell, user equipment 130 and 140.

The first base station 110 provides a first coverage range 110-*a*, and the second base station 120 provides a second coverage range 120-*a*.

Here, user equipment 130 is assumed within the first coverage range 110-*a*. Thus, the user equipment 130 communicates with the first base station 110 via a wireless link 150. User equipment 140 is assumed within the second coverage range 120-*a*. Thus, the user equipment 140 communicates with the second base station 120 via a wireless link 160. In addition, the first base station 110 communicates with the second base station 120 via a backhaul link 170. The backhaul link 170 may be wired and may also be wireless.

Here, it is assumed that the first base station 110 and the second base station 120 are eNBs of the LTE TDD system, and it is also assumed that the first base station 110 and the second base station 120 are base stations of adjacent cells.

Figure 2A:
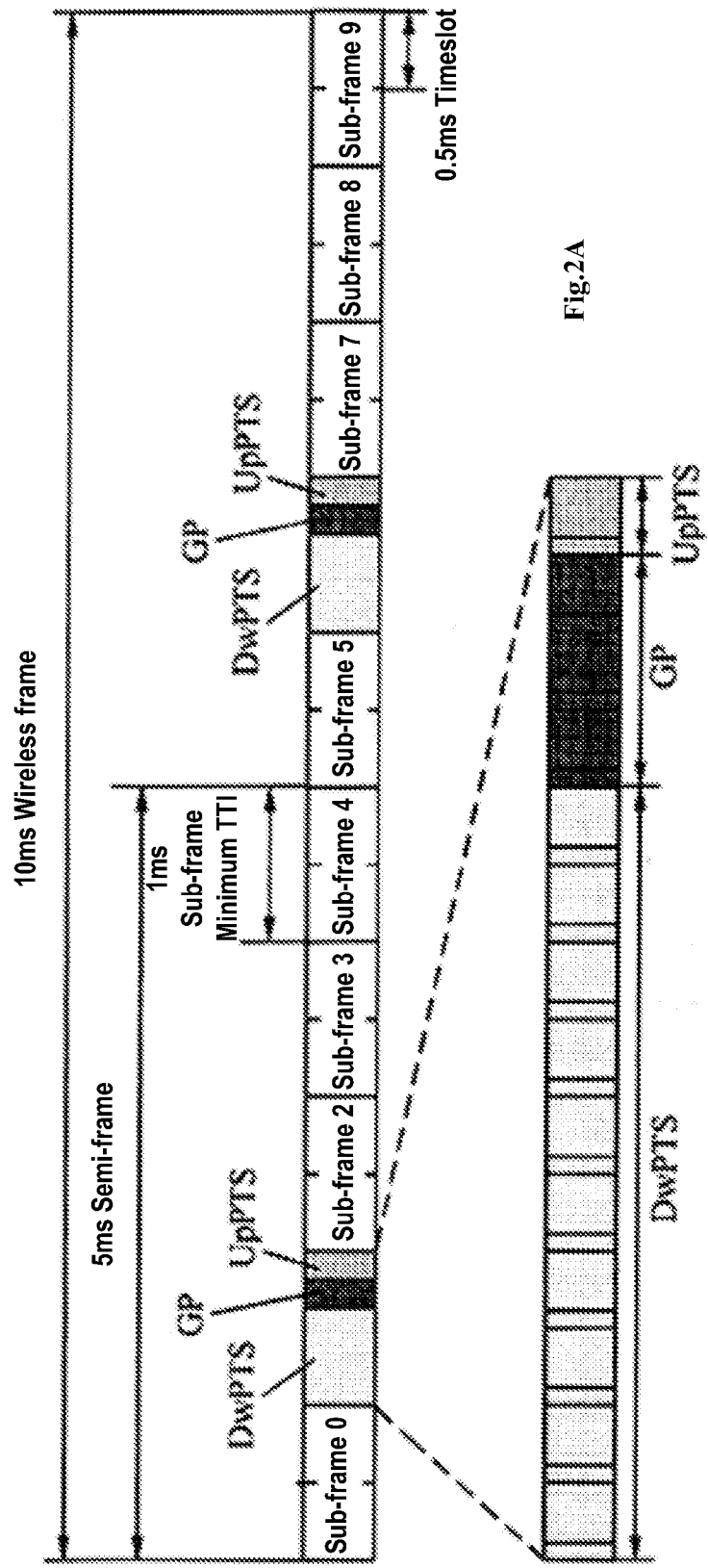
FIGS. 2A and 2B illustrate an LTE TDD frame structure according to the prior art.
Figure 2B:
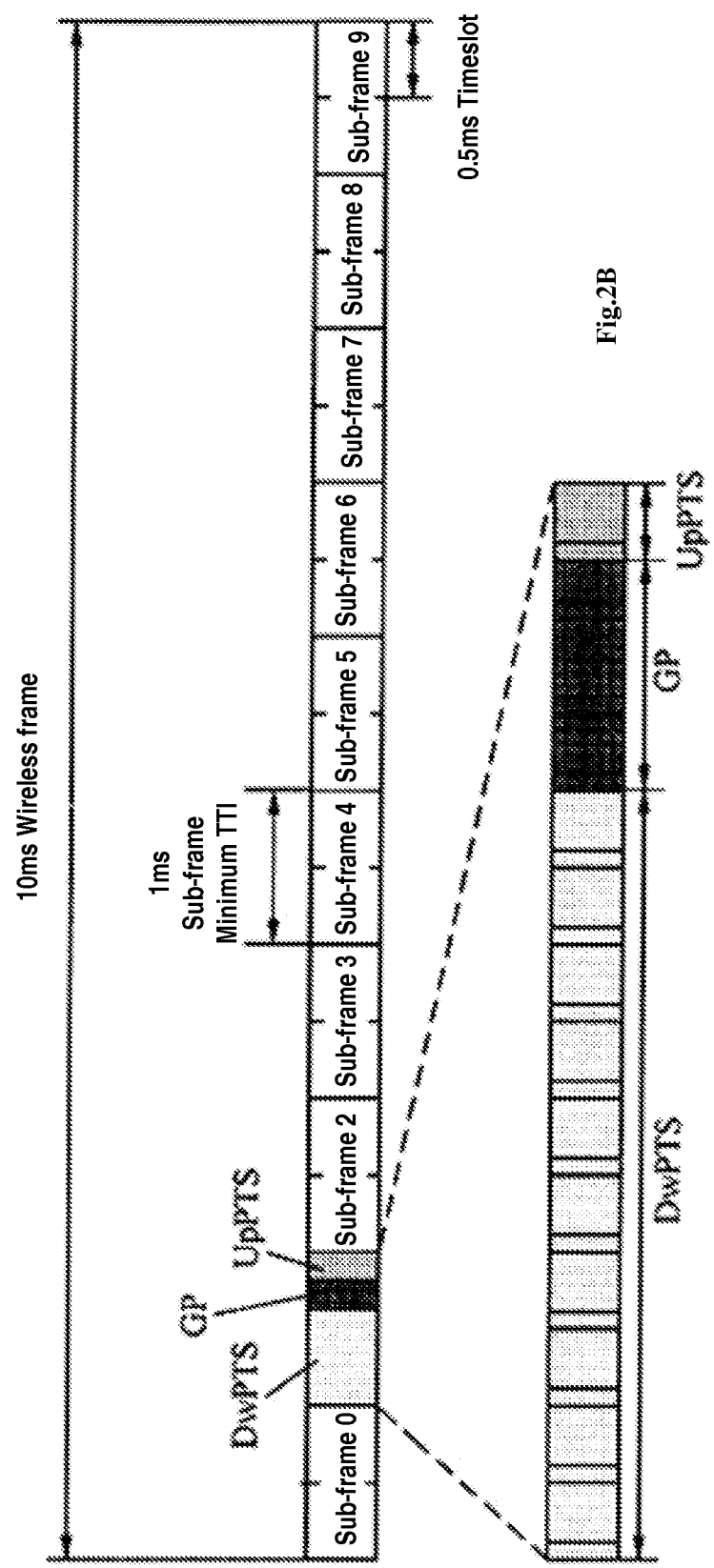

FIGS. 2A and 2B illustrate an LTE TDD frame structure according to the prior art. The frame structure illustrated in FIGS. 2A and 2B comprises 10 sub-frames including sub-frame 0, sub-frame 1, sub-frame 2, sub-frame 3, sub-frame 4, sub-frame 5, sub-frame 6, sub-frame 7, sub-frame 8 and sub-frame 9. The difference is that the frame structure illustrated in FIG. 2A comprises two special sub-frames, i.e. sub-frame 1 and sub-frame 6, while the frame structure illustrated in FIG. 2B only comprises one special sub-frame, i.e. sub-frame 1. The special sub-frame has three special timeslots: Downlink Pilot Time Slot (DwPTS), Gap Protection (GP) and Uplink Pilot Time Slot (UpPTS).

The 10 sub-frames employ a unified sub-frame length of 1 ms (corresponding to the minimum Transmission Time Interval TTI). The conventional sub-frame comprises two 0.5 ms timeslots.

According to the frequency of occurrence of the special sub-frame, the LTE TDD frame structure may be divided into two types, i.e. a 5 ms period frame structure and a 10 ms period frame structure. Thus, what illustrated in FIG. 2A is a 5 ms period frame structure and what illustrated in FIG. 2B is a 10 ms period frame structure.

The 5 ms period frame structure divides a 10 ms wireless frame into two 5 ms "semi-frames", which have completely identical structure and the same uplink/downlink sub-frame ratio.

Taking the conventional Cyclic Postfix (CP) as an example, like the conventional sub-frame, the special sub-frame also comprises 14 Orthogonal Frequency Division Multiplexing (OFDM) symbols.

In 5 sub-frames included in one semi-frame of the 5 ms period frame structure, except one special sub-frame, wherein the special sub-frame always comprises one downlink DwPTS, one uplink UpPTS and one GP, the ratio between the downlink sub-frames and the uplink sub-frames in the rest 4 conventional sub-frames can be: 3:1, 2:2 or 1:3.

In 10 sub-frames included in one wireless frame of the 10 ms period frame structure, except one special sub-frame, the ratio between the downlink sub-frames and the uplink sub-frames in the rest 9 conventional sub-frames can be: 8:1, 7:2, 6:3 or 3:5, wherein in the case of 3:5, one 10 ms wireless frame comprises 2 special sub-frames. Although in the last configuration, it is divided into 2 semi-frames, the 2 semi-frames have different uplink/downlink ratios and thus the period is still 10 ms.

Table 1 summarizes the uplink/downlink sub-frame configuration in the frame structure.

TABLE 1

| Uplink/downlink configuration | Sub-frame number | | | | | | | | | |
|---|---|---|---|---|---|---|---|---|---|---|
| serial number | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |

TABLE 1-continued

| Uplink/downlink configuration | Sub-frame number | | | | | | | | | |
|---|---|---|---|---|---|---|---|---|---|---|
| serial number | 0 | 1 | 2 | 3 | 4 | 5 | 6 | 7 | 8 | 9 |
| 6 | D | S | U | U | U | D | S | U | U | D |

Wherein, D represents a downlink sub-frame, U represents an uplink sub-frame, S represents a special sub-frame.

The LTE TDD system has a maximum bandwidth of 20 MHz, and can be configured to have a bandwidth of 20M, 15M, 10M, 5M, 3M or 1.4M.

The LTE TDD system allocates resources by allocating Resource Blocks (RB). Different bandwidths correspond to different number of allocated RBs. By an equation of:

$$RB\ number * 12 * sub\text{-}carrier\ gap = bandwidth,$$

the number of RBs can be derived in case that other parameter values are known.

Figure 3:
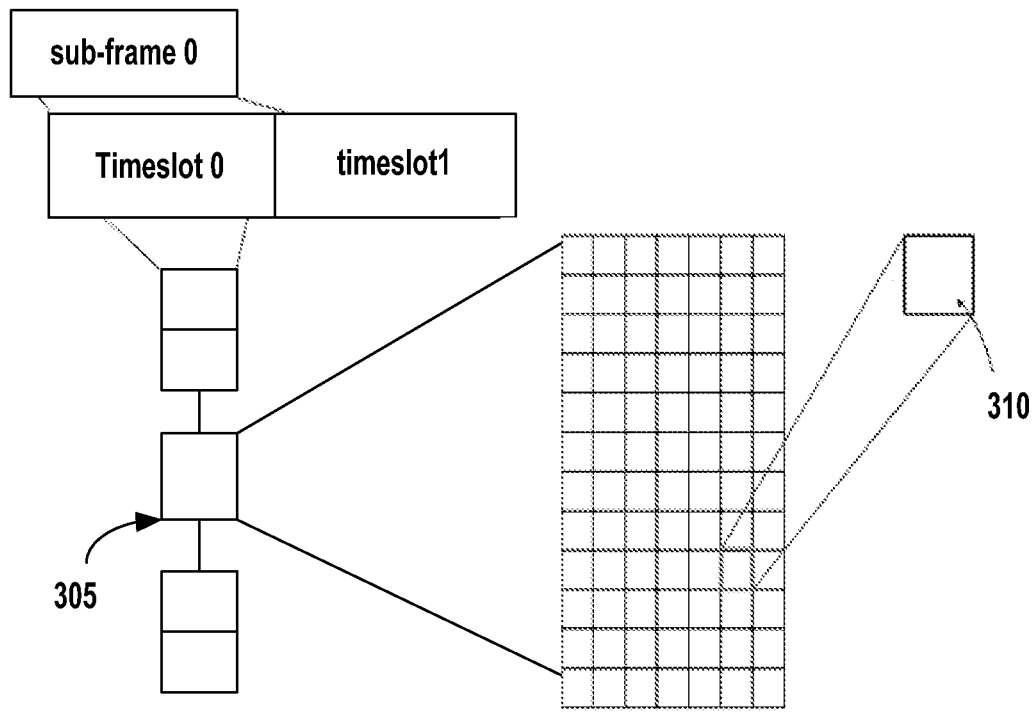
FIG. 3 illustrates an LTE TDD resource grid structure according to the prior art.

FIG. 3 illustrates an LTE TDD resource grid structure according to the prior art.

FIG. 3 illustrates a resource grid structure of the first timeslot of the sub-frame 0. Each RB 305 is a block of resources, and in terms of time, it contains a time-domain resource occupied by one timeslot in one sub-frame, i.e. 7 OFDM symbols, while in terms of frequency, it contains a frequency-domain resource occupied by 12 sub-carriers. The resource occupied by one sub-carrier on one OFDM symbol is called as a Resource Element (RE), as represented by 310. Thus, in a normal Cyclic Postfix (CP) mode, 1 RB=12*7 REs.

Certainly, those skilled in the art can understand that the second timeslot of the sub-frame 0 and the first timeslot and the second timeslot of other conventional sub-frames and special sub-frame have the same resource grid structure as illustrated in FIG. 3.

As described above, the LTE TDD system can deploy different uplink/downlink sub-frame configuration for adjacent cells.

That is to say, the first base station 110 corresponding to the first cell can deploy any uplink/downlink configuration in the 0-6 configurations as shown in Table 1, and the second base station 120 corresponding to the second cell can also deploy any uplink/downlink configuration in the 0-6 configurations as shown in Table 1 so that the uplink/downlink sub-frame configuration of the first base station 110 and that of the second base station 120 may be asymmetry, which may result in implementing a downlink sub-frame at the first cell while implementing an uplink sub-frame or a special sub-frame at the second cell, or result in implementing an uplink sub-frame or a special sub-frame at the first cell while implementing a downlink sub-frame at the second cell, thereby producing inter-cell interference.

In the following descriptions, it is assumed to implement a first type of sub-frame at the first cell while implementing a second type of sub-frame different from the first type of sub-frame at the second cell, wherein the first type of sub-frame may be a downlink sub-frame, an uplink sub-frame or a special sub-frame. Likewise, the second type of sub-frame may be a downlink sub-frame, an uplink sub-frame or a special sub-frame.

Figure 4:
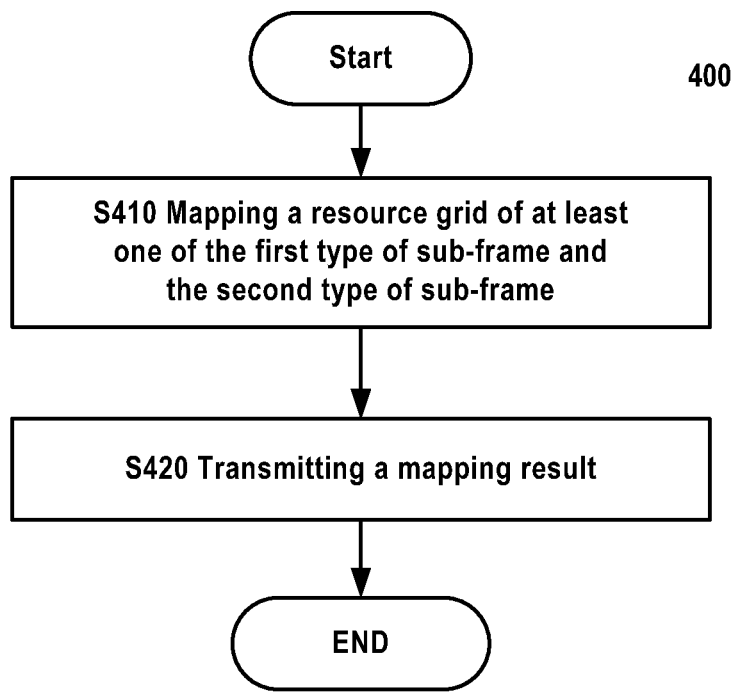
FIG. 4 illustrates a flowchart of a method for reducing interference resulting from implementing a first type of sub-frame at the first cell while implementing a second type of sub-frame different from the first type of sub-frame at the second cell in a wireless communication system, according to one embodiment of the present invention.

FIG. 4 illustrates a flowchart of a method for reducing interference resulting from implementing a first type of sub-frame at the first cell while implementing a second type of sub-frame different from the first type of sub-frame at the second cell in a wireless communication system, according to one embodiment of the present invention.

As illustrated in FIG. 4, the method 400 comprises Step S410: mapping a resource grid of at least one of the first type of sub-frame and the second type of sub-frame to reserve at least one of a resource element in the first type of sub-frame and corresponding to a resource element in the second type of sub-frame and mapped for at least one of a reference signal and a common control channel, and a resource element in the second type of sub-frame and corresponding to a resource element in the first type of sub-frame and mapped for at least one of a reference signal and a common control channel, for not transmitting information; and Step S420: transmitting a mapping result of the mapping step S410.

The method illustrated in FIG. 4 is applicable to a centralized scheduling & low latency scenario, e.g., a Remote Radio Head (RRH) based scenario 2/3/4 in 3GPP R1-110598, where the first base station 110 and the second base station 120 for example are RRH. In the above scenario, a device e.g. a resource allocation module of the base station not shown in FIG. 1 is used to implement the steps of the method illustrated in FIG. 4, i.e., centralizedly mapping a resource grid for each cell to reserve at least one of a resource element in the first type of sub-frame and corresponding to a resource element in the second type of sub-frame and mapped for at least one of a reference signal and a common control channel, and a resource element in the second type of sub-frame and corresponding to a resource element in the first type of sub-frame and mapped for at least one of a reference signal and a common control channel, for not transmitting information.

Figure 5:
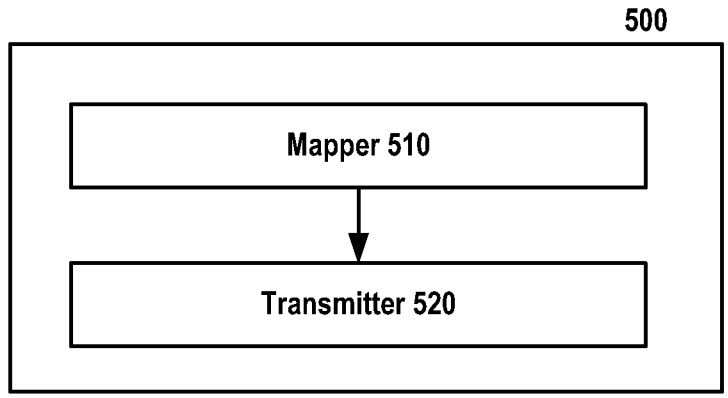
FIG. 5 illustrates a block diagram of an apparatus for implementing steps of the method illustrated in FIG. 4, according to one embodiment of the present invention.

FIG. 5 illustrates a block diagram of an apparatus for implementing steps of the method illustrated in FIG. 4, according to one embodiment of the present invention.

As illustrated in FIG. 5, the apparatus 500 comprises:

a mapper 510 configured to map a resource grid of at least one of the first type of sub-frame and the second type of sub-frame to reserve at least one of a resource element in the first type of sub-frame and corresponding to a resource element in the second type of sub-frame and mapped for at least one of a reference signal and a common control channel, and a resource element in the second type of sub-frame and corresponding to a resource element in the first type of sub-frame and mapped for at least one of a reference signal and a common control channel, for not transmitting information; and a transmitter 520 configured to transmit a mapping result of the mapper 510.

For example, in one embodiment of the present invention, the transmitter 520 transmits a mapping result of the mapper 510 to first and second base stations 110 and 120, and then the first and second base stations 110 and 120 respectively transmit the mapping result to their user equipment 130 and 140.

In another embodiment of the present invention, the transmitter 520 further transmits a mapping result of the mapper 510 to the user equipment 130 and 140 of the first and second cells.

Correspondingly, according to one embodiment of the present invention, the base station may implement the step of:

receiving information related to mapping of a resource grid of the first type of sub-frame or information related to mapping of a resource grid of the second type of sub-frame, wherein the resource grid of the first type of sub-frame is mapped as reserving a resource element in the first type of sub-frame and corresponding to a resource element in the second type of sub-frame and mapped for at least one of a reference signal and a common control channel, for not transmitting information; and the resource grid of the second type of sub-frame is mapped as reserving a resource element in the second type of sub-frame and corresponding to a resource element in the first type of sub-frame and mapped for at least one of a reference signal and a common control channel, for not transmitting information.

In case that the first base station 110 and the second base station 120 respectively transmit the information related to the mapping of the resource grid of the first type of sub-frame and the information related to the mapping of the resource grid of the second type of sub-frame to their user equipment 130 and 140, the base station may implement the step of:

transmitting the received information related to the mapping of the resource grid of the first type of sub-frame or information related to the mapping of the resource grid of the second type of sub-frame.

Correspondingly, according to one embodiment of the present invention, the base station may comprise:

a receiver configured to receive information related to mapping of a resource grid of the first type of sub-frame or information related to mapping of a resource grid of the second type of sub-frame, wherein the resource grid of the first type of sub-frame is mapped as reserving a resource element in the first type of sub-frame and corresponding to a resource element in the second type of sub-frame and mapped for at least one of a reference signal and a common control channel, for not transmitting information; and the resource grid of the second type of sub-frame is mapped as reserving a resource element in the second type of sub-frame and corresponding to a resource element in the first type of sub-frame and mapped for at least one of a reference signal and a common control channel, for not transmitting information.

And correspondingly, in case that the first and second base stations respectively transmit the information related to the mapping of the resource grid of the first type of sub-frame and the information related to the mapping of the resource grid of the second type of sub-frame to their user equipment, the base station may comprise:

a transmitter configured to transmit the received information related to the mapping of the resource grid of the first type of sub-frame or information related to the mapping of the resource grid of the second type of sub-frame.

Figure 6:
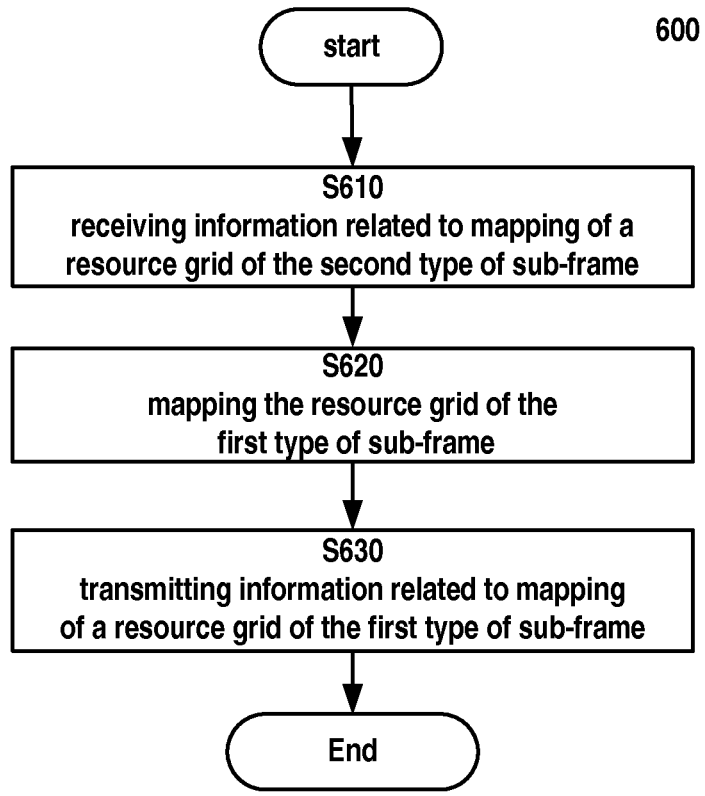
FIG. 6 illustrates a flowchart of a method for reducing interference resulting from implementing a first type of sub-frame at the first cell while implementing a second type of sub-frame different from the first type of sub-frame at the second cell in a wireless communication system, according to one embodiment of the present invention.

FIG. 6 illustrates a flowchart of a method for reducing interference resulting from implementing a first type of sub-frame at the first cell while implementing a second type of sub-frame different from the first type of sub-frame at the second cell in a wireless communication system, according to one embodiment of the present invention.

The method illustrated in FIG. 6 is applicable to a distributed scheduling & high latency scenario, e.g., inter-eNB or eNB-Home eNB. In the above scenario, without loss of generality, the first base station 110 as shown in FIG. 1 is used to implement steps of the method illustrated in FIG. 6 to reserve a resource element in the first type of sub-frame and corresponding to a resource element in the second type of sub-frame and mapped for at least one of a reference signal and a common control channel, for not transmitting information.

Certainly, those skilled in the art can understand that the second base station 120 shown in FIG. 1 may implement steps corresponding to the steps of the method illustrated in FIG. 6, which is not described in detail here for conciseness.

As illustrated in FIG. 6, the method comprises Step S610: receiving information related to mapping of a resource grid of the second type of sub-frame, and Step S620: mapping the resource grid of the first type of sub-frame to reserve a resource element in the first type of sub-frame and corresponding to a resource element in the second type of sub-frame and mapped for at least one of a reference signal and a common control channel, for not transmitting information.

As illustrated in FIG. 6, the method 600 may further comprise Step S630: transmitting information related to mapping of a resource grid of the first type of sub-frame.

For example, information related to the mapping of the resource grid of the first type of sub-frame may be transmitted to user equipment 130 in the first cell and the second base station 120.

Figures 7, 8A, 8B:
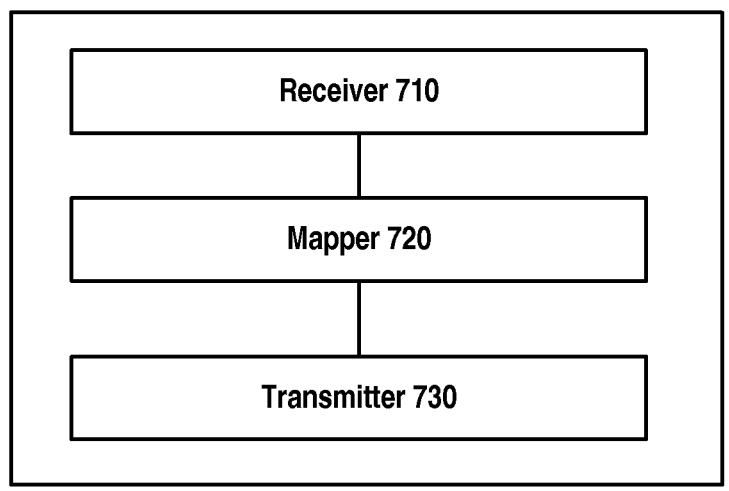
FIG. 7 illustrates a block diagram of a base station for implementing steps of the method illustrated in FIG. 6, according to one embodiment of the present invention.
FIG. 8A and FIG. 8B illustrate mapping of a resource grid in a downlink sub-frame and an uplink sub-frame according to one embodiment of the present invention.

FIG. 7 illustrates a block diagram of a base station for implementing steps of the method illustrated in FIG. 6 according to one embodiment of the present invention.

The base station, for example, is the first base station 110 shown in FIG. 1. Certainly, those skilled in the art can understand that the second base station 120 shown in FIG. 1 may have an apparatus corresponding to the apparatus had by the base station shown in FIG. 7, which is not described in detail here for conciseness.

As illustrated in FIG. 7, the base station 700 comprises a receiver 710 configured to receive information related to mapping of a resource grid of the second type of sub-frame, and a mapper 720 configured to map the resource grid of the first type of sub-frame to reserve a resource element in the first type of sub-frame and corresponding to a resource element in the second type of sub-frame and mapped for at least one of a reference signal and a common control channel, for not transmitting information.

As illustrated in FIG. 7, the base station 700 may further comprise a transmitter 730 configured to transmit information related to mapping of a resource grid of the first type of sub-frame, e.g. transmitting information related to the mapping of the resource grid of the first type of sub-frame to user equipment 130 in the first cell and the second base station 120.

For example, the first base station 110 may receive, from the second base station 120 via the backhaul link 170, information related to mapping of a resource grid of the second type of sub-frame such as Physical Control Format Indicator Channel (PCFICH configured to indicate the number (1, 2 or 3) of OFDM symbols for PDCCH transmission in one sub-frame), RS position, System Information Block (SIB)-2 position, Multicast Broadcast Single Frequency Network (MBSFN) configuration, SRS position, etc.

Since PCFICH is dynamically adjustable and its adjustment speed is slow, in one embodiment of the present invention, the PCFICH may not be used, and in order to ensure that the interference on the PDCCH could be reduced to the minimum, a resource element corresponding to 3 OFDM symbols predetermined to be allocated for the PDCCH may always be reserved for not transmitting information.

Correspondingly, according to one embodiment of the present invention, the user equipment may implement the step of:

receiving information related to mapping of a resource grid of the first type of sub-frame or information related to mapping of a resource grid of the second type of sub-frame, wherein the resource grid of the first type of sub-frame is mapped as reserving a resource element in the first type of sub-frame and corresponding to a resource element in the second type of sub-frame and mapped for at least one of a reference signal and a common control channel, for not transmitting information; and the resource grid of the second type of sub-frame is mapped as reserving a resource element in the second type of sub-frame and corresponding to a resource element in the first type of sub-frame and mapped for at least one of a reference signal and a common control channel, for not transmitting information.

Correspondingly, according to one embodiment of the present invention, the user equipment may comprise:

a receiver configured to receive information related to mapping of a resource grid of the first type of sub-frame or information related to mapping of a resource grid of the second type of sub-frame, wherein the resource grid of the first type of sub-frame is mapped as reserving a resource element in the first type of sub-frame and corresponding to a resource element in the second type of sub-frame and mapped for at least one of a reference signal and a common control channel, for not transmitting information; and the resource grid of the second type of sub-frame is mapped as reserving a resource element in the second type of sub-frame and corresponding to a resource element in the first type of sub-frame and mapped for at least one of a reference signal and a common control channel, for not transmitting information.

In one embodiment of the present invention, in case that the first type of sub-frame is a downlink sub-frame and the second type of sub-frame is a special sub-frame, only mapping the resource grid of the first type of sub-frame to reserve a resource element in the first type of sub-frame and corresponding to a resource element in the second type of sub-frame and mapped for at least one of a reference signal and a common control channel, for not transmitting information.

In one embodiment of the present invention, in case that the first type of sub-frame is a downlink sub-frame and the second type of sub-frame is an uplink sub-frame, mapping the resource grid of the first type of sub-frame to reserve a resource element in the first type of sub-frame and corresponding to a resource element in the second type of sub-frame and mapped for at least one of a reference signal and a common control channel, for not transmitting information, comprises: mapping the resource grid of the first type of sub-frame to reserve at least one of the following resource elements in the first type of sub-frame, for not transmitting information:

a resource element corresponding to a resource element mapped for a Physical Uplink Control Channel PUCCH in the second type of sub-frame;

a resource element corresponding to a resource element mapped for an Uplink Pilot Channel UpPCH in the second type of sub-frame;

a resource element corresponding to a resource element mapped for a channel Sounding Reference Signal SRS in the second type of sub-frame; and a resource element corresponding to a resource element mapped for an Uplink Demodulation Reference Signal UL DMRS in the second type of sub-frame.

Certainly, those skilled in the art can understand that other resource elements except the aforesaid resource elements in the first type of sub-frame may also be reserved for not transmitting information, or other resource elements rather than the aforesaid resource elements in the first type of sub-frame may be reserved for not transmitting information.

In addition, a resource element in the first type of sub-frame and corresponding to the resource element in the second type of sub-frame and mapped for the Uplink Demodulation Reference Signal UL DMRS or other uplink user equipment specific reference signals can be reserved for not transmitting information only when a Frequency Division Multiplexing (FDM) solution is used to handle the interference resulting from implementing a first type of sub-frame at the first cell while implementing a second type of sub-frame different from the first type of sub-frame at the second cell.

In one embodiment of the present invention, in case that the first type of sub-frame is a downlink sub-frame and the second type of sub-frame is an uplink sub-frame, mapping the resource grid of the second type of sub-frame to reserve a resource element in the second type of sub-frame and corresponding to a resource element in the first type of sub-frame and mapped for at least one of a reference signal and a common control channel, for not transmitting information, comprises: mapping the second type of sub-frame to reserve at least one of the following resource elements in the second type of sub-frame, for not transmitting information:

a resource element corresponding to a resource element mapped for a Physical Downlink Control Channel PDCCH in the first type of sub-frame;

a resource element corresponding to a resource element mapped for a Physical Broadcast Channel PBCH in the first type of sub-frame;

a resource element corresponding to a resource element mapped for a dynamic broadcast channel in the first type of sub-frame;

a resource element corresponding to a resource element mapped for a Channel State Information-Reference Signal CSI-RS in the first type of sub-frame;

a resource element corresponding to a resource element mapped for a Cell-Specific Reference Signal CRS in the first type of sub-frame;

a resource element corresponding to a resource element mapped for a Downlink Demodulation Reference Signal DL DMRS in the first type of sub-frame.

Certainly, those skilled in the art can understand that other resource elements except the aforesaid resource elements in the second type of sub-frame may also be reserved for not transmitting information, or other resource elements rather than the aforesaid resource elements in the second type of sub-frame may be reserved for not transmitting information.

In addition, a resource element in the second type of sub-frame and corresponding to the resource element in the first type of sub-frame and mapped for the Downlink Demodulation Reference Signal DL DMRS or other downlink user equipment specific reference signals can be reserved for not transmitting information only when a Frequency Division Multiplexing (FDM) solution is used to handle the interference resulting from implementing a first type of sub-frame at the first cell while implementing a second type of sub-frame different from the first type of sub-frame at the second cell.

Furthermore, when the downlink sub-frame employs the MBSFN configuration, it is unnecessary to reserve the resource element in the second type of sub-frame and corresponding to the resource element in the first type of sub-frame and mapped for a Cell-Specific Reference Signal CRS, for not transmitting information.

In addition, since some resource elements in the resource grid are reserved for not transmitting information according to the present invention, the power of the resource elements for transmitting data in the resource grid should be increased so that a transmission power of the uplink sub-frame remains the same as that of the other uplink sub-frames.

FIG. 8A and FIG. 8B illustrate mapping of a resource grid in a downlink sub-frame and an uplink sub-frame according to one embodiment of the present invention, wherein FIG. 8A illustrates mapping of a resource grid in a downlink sub-frame according to one embodiment of the present invention and FIG. 8B illustrate mapping of a resource grid in an uplink sub-frame according to one embodiment of the present invention.

As illustrated in FIG. 8A, resource elements marked as 1 are allocated for PDCCH; resource elements marked as 2 are allocated for CSI-RS; resource elements marked as 3 are allocated for CRS; resource elements marked as R are reserved as not transmitting information, while other resource elements not marked by a reference number or letter are used for transmitting data.

As illustrated in FIG. 8B, resource elements marked as 1 are allocated for SRS; resource elements marked as R are reserved as not transmitting information, while other resource elements not marked by a reference number or letter are used for transmitting data.

It can be seen from FIG. 8A that the resource elements in the downlink sub-frame and corresponding to the resource elements in the uplink sub-frame and allocated for SRS are reserved for not transmitting information.

It can be seen from FIG. 8B that the resource elements in the uplink sub-frame and corresponding to the resource elements in the downlink sub-frame and allocated for PDCCH, CRS and CSI-RS are reserved for not transmitting information.

It should be noted that in order to make the present invention easier to understand, some more specific technical details that are well-known to those skilled in the art and may be essential for implementation of the present invention are omitted in the above descriptions.

Hence, selecting and describing the embodiments is to better explain the principle of the present invention and its actual application, and to make it clear for those of ordinary skill in the art that without departure from the essence of the present invention, all modifications and changes fall within the protection scope of the present invention limited by claims.

In addition, those skilled in the art can understand that the steps of various methods described above may be implemented by a programmed computer. Here, some embodiments aim to cover a program storage apparatus, which is machine or computer readable, and encoded with machine or computer executable instruction programs, wherein the instruction implements some or all steps of the methods. The program storage apparatus may be, for example, a magnetic storage medium such as a magnetic disk, a magnetic tape, a hard disk driver or an optical readable digital data storage medium. The embodiments also aim to cover a computer programmed to implement the steps of the methods.

What is claimed is:

1. A method for reducing interference in a wireless communication system, the wireless communication system comprising a first cell and a second cell, wherein an uplink/downlink sub-frame configuration of the first cell and the second cell is asymmetric and can result in implementing a first type of sub-frame at the first cell while implementing a second type of sub-frame different from the first type of sub-frame at the second cell, thereby producing inter-cell interference, the method comprising:

mapping a resource grid of at least one of the first type of sub-frame and the second type of sub-frame to reserve at least one of a first resource element in the first type of sub-frame and corresponding to a second resource element in the second type of sub-frame and mapped for at least one of a first reference signal and a common control channel, and a third resource element in the second type of sub-frame and corresponding to a fourth resource element in the first type of sub-frame and mapped for at least one of a second reference signal and the common control channel, for not transmitting information; and transmitting a mapping result of the mapping.

2. The method according to claim 1, wherein the first type of sub-frame is a downlink sub-frame and the second type of sub-frame is an uplink sub-frame.

3. The method according to claim 1, wherein the first type of sub-frame is a downlink sub-frame and the second type of sub-frame is a special sub-frame; and wherein only a resource grid of the first type of sub-frame is mapped to reserve the first resource element in the first type of sub-frame and corresponding to the second resource element in the second type of sub-frame and mapped for at least one of the first reference signal and the common control channel, for not transmitting information.

4. The method according to claim 2, wherein mapping a resource grid of the first type of sub-frame to reserve the first resource element in the first type of sub-frame and corresponding to the second resource element in the second type of sub-frame and mapped for at least one of the first reference signal and the common control channel, for not transmitting information, comprises: mapping a resource grid of the first type of sub-frame to reserve at least one of the following resource elements in the first type of sub-frame, for not transmitting information:

a resource element corresponding to a resource element mapped for a Physical Uplink Control Channel in the second type of sub-frame;

a resource element corresponding to a resource element mapped for an Uplink Pilot Channel in the second type of sub-frame;

a resource element corresponding to a resource element mapped for a channel Sounding Reference Signal in the second type of sub-frame; and a resource element corresponding to a resource element mapped for an Uplink Demodulation Reference Signal in the second type of sub-frame.

5. The method according to claim 2, wherein mapping a resource grid of the second type of sub-frame to reserve the third resource element in the second type of sub-frame and corresponding to the fourth resource element in the first type of sub-frame and mapped for at least one of the first reference signal and the common control channel, for not transmitting information, comprises: mapping a resource grid of the second type of sub-frame to reserve at least one of the following resource elements in the second type of sub-frame, for not transmitting information:

a resource element corresponding to a resource element mapped for a Physical Downlink Control Channel in the first type of sub-frame;

a resource element corresponding to a resource element mapped for a Physical Broadcast Channel in the first type of sub-frame;

a resource element corresponding to a resource element mapped for a dynamic broadcast channel in the first type of sub-frame;

a resource element corresponding to a resource element mapped for a Channel State Information-Reference Signal in the first type of sub-frame;

a resource element corresponding to a resource element mapped for a Cell-Specific Reference Signal in the first type of sub-frame;

a resource element corresponding to a resource element mapped for a Downlink Demodulation Reference Signal in the first type of sub-frame.

6. An apparatus for reducing interference in a wireless communication system, the wireless communication system comprising a first cell and a second cell, wherein an uplink/downlink sub-frame configuration of the first cell and the second cell is asymmetric and can result in implementing a first type of sub-frame at the first cell while implementing a second type of sub-frame different from the first type of sub-frame at the second cell, thereby producing inter-cell interference, the apparatus comprising:

a mapper configured to map a resource grid of at least one of the first type of sub-frame and the second type of sub-frame to reserve at least one of a first resource element in the first type of sub-frame and corresponding to a second resource element in the second type of sub-frame and mapped for at least one of a first reference signal and a common control channel, and a third resource element in the second type of sub-frame and corresponding to a fourth resource element in the first type of sub-frame and mapped for at least one of a second reference signal and the common control channel, for not transmitting information; and a transmitter configured to transmit a mapping result of the mapper.

7. A method for reducing interference in a wireless communication system, the wireless communication system comprising a first cell and a second cell, wherein an uplink/downlink sub-frame configuration of the first cell and the second cell is asymmetric and can result in implementing a first type of sub-frame at the first cell while implementing a second type of sub-frame different from the first type of sub-frame at the second cell, thereby producing inter-cell interference, the method comprising:

receiving information related to mapping of a resource grid of the first type of sub-frame or information related to mapping of a resource grid of the second type of sub-frame, wherein the resource grid of the first type of sub-frame is mapped as reserving a first resource element in the first type of sub-frame and corresponding to a second resource element in the second type of sub-frame and mapped for at least one of a first reference signal and a common control channel, for not transmitting information; and the resource grid of the second type of sub-frame is mapped as reserving a third resource element in the second type of sub-frame and corresponding to a fourth resource element in the first type of sub-frame and mapped for at least one of a second reference signal and the common control channel, for not transmitting information.

8. A base station for reducing interference in a wireless communication system, the wireless communication system comprising a first cell and a second cell, wherein an uplink/downlink sub-frame configuration of the first cell and the second cell is asymmetric and can result in implementing a first type of sub-frame at the first cell while implementing a second type of sub-frame different from the first type of sub-frame at the second cell, thereby producing inter-cell interference, the base station comprising:

a receiver configured to receive information related to mapping of a resource grid of the first type of sub-frame or information related to mapping of a resource grid of the second type of sub-frame, wherein the resource grid of the first type of sub-frame is mapped as reserving a first resource element in the first type of sub-frame and corresponding to a second resource element in the second type of sub-frame and mapped for at least one of a reference signal and a common control channel, for not transmitting information; and the resource grid of the second type of sub-frame is mapped as reserving a third resource element in the second type of sub-frame and corresponding to a fourth resource element in the first type of sub-frame and mapped for at least one of a second reference signal and the common control channel, for not transmitting information.

9. A method for reducing interference in a wireless communication system, the wireless communication system comprising a first cell and a second cell, wherein an uplink/downlink sub-frame configuration of the first cell and the second cell is asymmetric and can result in implementing a first type of sub-frame at the first cell while implementing a second type of sub-frame different from the first type of sub-frame at the second cell, thereby producing inter-cell interference, the method comprising:

receiving information related to mapping of a resource grid of the second type of sub-frame;

mapping a resource grid of the first type of sub-frame to reserve a resource element in the first type of sub-frame and corresponding to a resource element in the second type of sub-frame and mapped for at least one of a reference signal and a common control channel, for not transmitting information.

10. The method according to claim 9, wherein the first type of sub-frame is a downlink sub-frame and the second type of sub-frame is an uplink sub-frame; and wherein mapping the resource grid of the first type of sub-frame to reserve the first resource element in the first type of sub-frame and corresponding to the second resource element in the second type of sub-frame and mapped for at least one of the first reference signal and the common control channel, for not transmitting information, comprises: mapping the resource grid of the first type of sub-frame to reserve at least one of the following resource elements in the first type of sub-frame, for not transmitting information:

a resource element corresponding to a resource element mapped for a Physical Uplink Control Channel in the second type of sub-frame;

a resource element corresponding to a resource element mapped for an Uplink Pilot Channel in the second type of sub-frame;

a resource element corresponding to a resource element mapped for a channel Sounding Reference Signal in the second type of sub-frame; and a resource element corresponding to a resource element mapped for an Uplink Demodulation Reference Signal in the second type of sub-frame.

11. The method according to claim 9, wherein the first type of sub-frame is an uplink sub-frame and the second type of sub-frame is a downlink sub-frame; and wherein mapping the resource grid of the first type of sub-frame to reserve the first resource element in the first type of sub-frame and corresponding to the second resource element in the second type of sub-frame and mapped for at least one of the first reference signal and the common control channel, for not transmitting information, comprises: mapping the resource grid of the first type of sub-frame to reserve at least one of the following resource elements in the first type of sub-frame, for not transmitting information:

a resource element corresponding to a resource element mapped for a Physical Downlink Control Channel in the second type of sub-frame;

a resource element corresponding to a resource element mapped for a Physical Broadcast Channel in the second type of sub-frame;

a resource element corresponding to a resource element mapped for a dynamic broadcast channel in the second type of sub-frame;

a resource element corresponding to a resource element mapped for a Channel State Information-Reference Signal in the second type of sub-frame;

a resource element corresponding to a resource element mapped for a Cell-Specific Reference Signal in the second type of sub-frame;

a resource element corresponding to a resource element mapped for a Downlink Demodulation Reference Signal in the second type of sub-frame.

12. The method according to claim 9, further comprising: transmitting information related to mapping of the resource grid of the first type of sub-frame.

13. A base station for reducing interference in a wireless communication system, the wireless communication system comprising a first cell and a second cell, wherein an uplink/downlink sub-frame configuration of the first cell and the second cell is asymmetric and can result in implementing a first type of sub-frame at the first cell while implementing a second type of sub-frame different from the first type of sub-frame at the second cell, thereby producing inter-cell interference, the base station comprising:

a receiver configured to receive information related to mapping of a resource grid of the second type of sub-frame;

a mapper configured to map a resource grid of the first type of sub-frame to reserve a resource element in the first type of sub-frame and corresponding to a resource element in the second type of sub-frame and mapped for at least one of a reference signal and a common control channel, for not transmitting information.

14. The base station according to claim 13, further comprising:

a transmitter configured to transmit information related to mapping of a resource grid of the first type of sub-frame.

15. A User equipment for reducing interference in a wireless communication system, the wireless communication system comprising a first cell and a second cell, wherein an uplink/downlink sub-frame configuration of the first cell and the second cell is asymmetric and can result in implementing a first type of sub-frame at the first cell while implementing a second type of sub-frame different from the first type of sub-frame at the second cell, thereby producing inter-cell interference, the user equipment comprising:

a receiver configured to receive information related to mapping of a resource grid of the first type of sub-frame or information related to mapping of a resource grid of the second type of sub-frame, wherein the resource grid of the first type of sub-frame is mapped as reserving a first resource element in the first type of sub-frame and corresponding to a second resource element in the second type of sub-frame and mapped for at least one of a first reference signal and a common control channel, for not transmitting information; and the resource grid of the second type of sub-frame is mapped as reserving a third resource element in the second type of sub-frame and corresponding to a fourth resource element in the first type of sub-frame and mapped for at least one of a second reference signal and the common control channel, for not transmitting information.

* * * * *